(12) United States Patent
Wehner et al.

(10) Patent No.: US 7,300,153 B2
(45) Date of Patent: Nov. 27, 2007

(54) DOUBLE PROGRESSIVE SPECTACLE LENS

(75) Inventors: Edda Wehner, Munich (DE); Andrea Welk, Munich (DE); Gregor Esser, Munich (DE); Helmut Altheimer, Baisweil-Lauchdorf (DE); Walter Haimerl, Munich (DE)

(73) Assignee: Rodenstock GmbH, Munich (DE)

( * ) Notice: Subject to any disclaimer, the term of this patent is extended or adjusted under 35 U.S.C. 154(b) by 0 days.

(21) Appl. No.: 10/542,701

(22) PCT Filed: Dec. 19, 2003

(86) PCT No.: PCT/EP03/14618

§ 371 (c)(1),
(2), (4) Date: Mar. 1, 2006

(87) PCT Pub. No.: WO2004/066020

PCT Pub. Date: Aug. 5, 2004

(65) Prior Publication Data

US 2006/0268223 A1 Nov. 30, 2006

(30) Foreign Application Priority Data

Jan. 21, 2003 (DE) ............................. 103 02 152

(51) Int. Cl.
G02C 7/06 (2006.01)
G02C 7/02 (2006.01)
(52) U.S. Cl. ...................... 351/169; 351/159
(58) Field of Classification Search ............... 351/159, 351/168, 169
See application file for complete search history.

(56) References Cited

U.S. PATENT DOCUMENTS

2002/0196410 A1 12/2002 Menezes

*Primary Examiner*—Scott J. Sugarman
*Assistant Examiner*—Darryl J. Collins
(74) *Attorney, Agent, or Firm*—Crowell & Moring LLP

(57) ABSTRACT

A double progressive spectacle lens in which a first prescribed progressive surface can be freely designed. The second progressive surface is then optimized in relation to the first prescribed surface. Thereby, the resulting spectacle lens avoids the need to employ a classic hourglass design progression zone and produces optical and geometric advantages such as an overall height of the progressive lens.

12 Claims, 6 Drawing Sheets

Table 1

Sagitta of the front surface

| | 0.00000 | -20.00000 | -17.50000 | -15.00000 | -12.50000 | -10.00000 | -7.50000 | -5.00000 | -2.50000 | 0.00000 |
|---|---|---|---|---|---|---|---|---|---|---|
| 20.00000 | 0.00000 | 0.00000 | 0.00000 | 0.00000 | 0.00000 | 0.00000 | 0.00000 | 0.00000 | 0.00000 | |
| 17.50000 | 0.00000 | 0.00000 | 0.00000 | 0.00000 | 0.00000 | 0.00000 | 1.47600 | 1.34211 | 1.26126 | 1.23419 |
| 15.00000 | 0.00000 | 0.00000 | 0.00000 | 0.00000 | 1.57865 | 1.34203 | 1.15532 | 1.02013 | 0.93811 | 0.91043 |
| 12.50000 | 0.00000 | 0.00000 | 0.00000 | 1.59770 | 1.31292 | 1.07561 | 0.88791 | 0.75190 | 0.66923 | 0.64142 |
| 10.00000 | 0.00000 | 0.00000 | 0.00000 | 1.38226 | 1.09798 | 0.86028 | 0.67172 | 0.53512 | 0.45248 | 0.42503 |
| 7.50000 | 0.00000 | 0.00000 | 1.54571 | 1.21652 | 0.93214 | 0.69351 | 0.50377 | 0.36657 | 0.28406 | 0.25675 |
| 5.00000 | 0.00000 | 0.00000 | 1.42786 | 1.09920 | 0.81419 | 0.57365 | 0.38166 | 0.24290 | 0.15988 | 0.13256 |
| 2.50000 | 0.00000 | 0.00000 | 1.35845 | 1.02848 | 0.74220 | 0.49926 | 0.30389 | 0.16227 | 0.07776 | 0.04990 |
| 0.00000 | 0.00000 | 0.00000 | 1.34036 | 1.00546 | 0.71526 | 0.46883 | 0.26980 | 0.12470 | 0.03735 | 0.00780 |
| -2.50000 | 0.00000 | 0.00000 | 1.37688 | 1.03343 | 0.73643 | 0.48529 | 0.28218 | 0.13221 | 0.04006 | 0.00839 |
| -5.00000 | 0.00000 | 0.00000 | 1.47103 | 1.11672 | 0.81047 | 0.55229 | 0.34361 | 0.18770 | 0.08989 | 0.05645 |
| -7.50000 | 0.00000 | 0.00000 | 1.62574 | 1.25982 | 0.94349 | 0.67669 | 0.46058 | 0.29773 | 0.19444 | 0.16009 |
| -10.00000 | 0.00000 | 0.00000 | 0.00000 | 1.46613 | 1.13948 | 0.86372 | 0.64029 | 0.47147 | 0.36388 | 0.32860 |
| -12.50000 | 0.00000 | 0.00000 | 0.00000 | 1.73288 | 1.39803 | 1.11607 | 0.88747 | 0.71579 | 0.60678 | 0.56982 |
| -15.00000 | 0.00000 | 0.00000 | 0.00000 | 0.00000 | 1.72008 | 1.43560 | 1.20514 | 1.03334 | 0.92542 | 0.88766 |
| -17.50000 | 0.00000 | 0.00000 | 0.00000 | 0.00000 | 0.00000 | 0.00000 | 1.59242 | 1.42264 | 1.31733 | 1.28118 |
| -20.00000 | 0.00000 | 0.00000 | 0.00000 | 0.00000 | 0.00000 | 0.00000 | 0.00000 | 0.00000 | 0.00000 | 0.00000 |

| | 0.00000 | 2.50000 | 5.00000 | 7.50000 | 10.00000 | 12.50000 | 15.00000 | 17.50000 | 20.00000 |
|---|---|---|---|---|---|---|---|---|---|
| 20.00000 | 0.00000 | 0.00000 | 0.00000 | 0.00000 | 0.00000 | 0.00000 | 0.00000 | 0.00000 | 0.00000 |
| 17.50000 | 1.26152 | 1.34238 | 1.47599 | 0.00000 | 0.00000 | 0.00000 | 0.00000 | 0.00000 | |
| 15.00000 | 0.93815 | 1.02020 | 1.15523 | 1.34169 | 1.57816 | 0.00000 | 0.00000 | 0.00000 | |
| 12.50000 | 0.66917 | 0.75184 | 0.88777 | 1.07544 | 1.31290 | 1.59797 | 0.00000 | 0.00000 | |
| 10.00000 | 0.45250 | 0.53516 | 0.67173 | 0.86044 | 1.09859 | 1.38342 | 0.00000 | 0.00000 | |
| 7.50000 | 0.28423 | 0.36684 | 0.50406 | 0.69394 | 0.93295 | 1.21787 | 1.54765 | 0.00000 | |
| 5.00000 | 0.16011 | 0.24330 | 0.38217 | 0.57411 | 0.81474 | 1.10053 | 1.43040 | 0.00000 | |
| 2.50000 | 0.07790 | 0.16258 | 0.30428 | 0.49968 | 0.74318 | 1.03086 | 1.36219 | 0.00000 | |
| 0.00000 | 0.03731 | 0.12478 | 0.26993 | 0.46971 | 0.71778 | 1.00943 | 1.34467 | 0.00000 | |
| -2.50000 | 0.03972 | 0.13191 | 0.28249 | 0.48726 | 0.74019 | 1.03786 | 1.38101 | 0.00000 | |
| -5.00000 | 0.08948 | 0.18719 | 0.34369 | 0.55377 | 0.81345 | 1.12042 | 1.47459 | 0.00000 | |
| -7.50000 | 0.19427 | 0.29758 | 0.46046 | 0.67682 | 0.94458 | 1.26199 | 1.62804 | 0.00000 | |
| -10.00000 | 0.36400 | 0.47182 | 0.64052 | 0.86357 | 1.13927 | 1.46620 | 0.00000 | 0.00000 | |
| -12.50000 | 0.60708 | 0.71637 | 0.88799 | 1.11623 | 1.39734 | 1.73146 | 0.00000 | 0.00000 | |
| -15.00000 | 0.92570 | 1.03403 | 1.20590 | 1.43607 | 1.71963 | 0.00000 | 0.00000 | 0.00000 | |
| -17.50000 | 1.31771 | 1.42358 | 1.59357 | 0.00000 | 0.00000 | 0.00000 | 0.00000 | 0.00000 | |
| -20.00000 | 0.00000 | 0.00000 | 0.00000 | 0.00000 | 0.00000 | 0.00000 | 0.00000 | 0.00000 | |

Table 2

Sagitta of the rear surface

| | -20.00000 | -17.50000 | -15.00000 | -12.50000 | -10.00000 | -7.50000 | -5.00000 | -2.50000 | 0.00000 |
|---|---|---|---|---|---|---|---|---|---|
| 20.00000 | 0.00000 | 0.00000 | 0.00000 | 0.00000 | 0.00000 | 0.00000 | 0.00000 | 0.00000 | 1.40800 |
| 17.50000 | 0.00000 | 0.00000 | 0.00000 | 0.00000 | 0.00000 | 1.27104 | 1.15222 | 1.08025 | 1.05602 |
| 15.00000 | 0.00000 | 0.00000 | 0.00000 | 1.34556 | 1.13723 | 0.97199 | 0.85164 | 0.77832 | 0.75348 |
| 12.50000 | 0.00000 | 0.00000 | 1.34460 | 1.09630 | 0.88799 | 0.72191 | 0.60055 | 0.52625 | 0.50091 |
| 10.00000 | 0.00000 | 0.00000 | 1.13884 | 0.89267 | 0.68518 | 0.51890 | 0.39720 | 0.32272 | 0.29752 |
| 7.50000 | 0.00000 | 1.25711 | 0.97626 | 0.73239 | 0.52620 | 0.36024 | 0.23861 | 0.16452 | 0.13965 |
| 5.00000 | 0.00000 | 1.13213 | 0.85471 | 0.61355 | 0.40845 | 0.24259 | 0.12101 | 0.04722 | 0.02253 |
| 2.50000 | 0.00000 | 1.04695 | 0.77163 | 0.53318 | 0.32991 | 0.16419 | 0.04196 | -0.03216 | -0.05694 |
| 0.00000 | 1.31916 | 1.00421 | 0.72818 | 0.49003 | 0.28776 | 0.12267 | 0.00040 | -0.07433 | -0.10016 |
| -2.50000 | 0.00000 | 1.00547 | 0.72632 | 0.48601 | 0.28373 | 0.11976 | 0.00250 | -0.07866 | -0.10548 |
| -5.00000 | 0.00000 | 1.05150 | 0.76815 | 0.52449 | 0.32059 | 0.15669 | 0.03428 | -0.04316 | -0.07002 |
| -7.50000 | 0.00000 | 1.14360 | 0.85606 | 0.60918 | 0.40344 | 0.23844 | 0.11490 | 0.03636 | 0.01031 |
| -10.00000 | 0.00000 | 0.00000 | 0.99162 | 0.74178 | 0.53412 | 0.36820 | 0.24447 | 0.16580 | 0.13968 |
| -12.50000 | 0.00000 | 0.00000 | 1.16970 | 0.91886 | 0.71277 | 0.54808 | 0.42577 | 0.34890 | 0.32223 |
| -15.00000 | 0.00000 | 0.00000 | 0.00000 | 1.14147 | 0.93849 | 0.77721 | 0.65820 | 0.58424 | 0.55840 |
| -17.50000 | 0.00000 | 0.00000 | 0.00000 | 0.00000 | 0.00000 | 1.05139 | 0.93701 | 0.86689 | 0.84324 |
| -20.00000 | 0.00000 | 0.00000 | 0.00000 | 0.00000 | 0.00000 | 0.00000 | 0.00000 | 0.00000 | 1.16735 |

| | 0.00000 | 2.50000 | 5.00000 | 7.50000 | 10.00000 | 12.50000 | 15.00000 | 17.50000 | 20.00000 |
|---|---|---|---|---|---|---|---|---|---|
| 20.00000 | 0.00000 | 0.00000 | 0.00000 | 0.00000 | 0.00000 | 0.00000 | 0.00000 | 0.00000 | 0.00000 |
| 17.50000 | 1.08001 | 1.15142 | 1.26938 | 0.00000 | 0.00000 | 0.00000 | 0.00000 | 0.00000 | 0.00000 |
| 15.00000 | 0.77796 | 0.85071 | 0.97024 | 1.13463 | 1.34224 | 0.00000 | 0.00000 | 0.00000 | 0.00000 |
| 12.50000 | 0.52573 | 0.59947 | 0.72012 | 0.88552 | 1.09328 | 1.34114 | 0.00000 | 0.00000 | 0.00000 |
| 10.00000 | 0.32219 | 0.39610 | 0.51719 | 0.68305 | 0.89036 | 1.13638 | 0.00000 | 0.00000 | 0.00000 |
| 7.50000 | 0.16412 | 0.23772 | 0.35880 | 0.52443 | 0.73051 | 0.97432 | 1.25522 | 0.00000 | 0.00000 |
| 5.00000 | 0.04694 | 0.12030 | 0.24134 | 0.40664 | 0.61154 | 0.85303 | 1.13066 | 0.00000 | 0.00000 |
| 2.50000 | -0.03253 | 0.04121 | 0.16295 | 0.32817 | 0.53165 | 0.77087 | 1.04618 | 0.00000 | 0.00000 |
| 0.00000 | -0.07488 | -0.00060 | 0.12124 | 0.28672 | 0.48986 | 0.72812 | 1.00309 | 1.31631 | 0.00000 |
| -2.50000 | -0.07953 | -0.00379 | 0.11875 | 0.28371 | 0.48642 | 0.72600 | 1.00376 | 0.00000 | 0.00000 |
| -5.00000 | -0.04408 | 0.03276 | 0.15516 | 0.31959 | 0.52381 | 0.76687 | 1.04867 | 0.00000 | 0.00000 |
| -7.50000 | 0.03567 | 0.11366 | 0.23650 | 0.40097 | 0.60666 | 0.85297 | 1.13887 | 0.00000 | 0.00000 |
| -10.00000 | 0.16532 | 0.24351 | 0.36638 | 0.53114 | 0.73756 | 0.98612 | 0.00000 | 0.00000 | 0.00000 |
| -12.50000 | 0.34849 | 0.42488 | 0.54637 | 0.70974 | 0.91389 | 1.16299 | 0.00000 | 0.00000 | 0.00000 |
| -15.00000 | 0.58379 | 0.65744 | 0.77567 | 0.93565 | 1.13682 | 0.00000 | 0.00000 | 0.00000 | 0.00000 |
| -17.50000 | 0.86666 | 0.93648 | 1.05019 | 0.00000 | 0.00000 | 0.00000 | 0.00000 | 0.00000 | 0.00000 |
| -20.00000 | 0.00000 | 0.00000 | 0.00000 | 0.00000 | 0.00000 | 0.00000 | 0.00000 | 0.00000 | 0.00000 |

DOUBLE PROGRESSIVE SPECTACLE LENS

CROSS REFERENCE TO RELATED APPLICATIONS

This application is a National Phase Entry under 35 U.S.C. § 371 of PCT/EP2003/14618, filed Dec. 19, 2003, which is based on and claims the benefit of priority under 35 U.S.C. § 119 to German patent application no. 103024152.3, filed Jan. 21, 2003, the disclosure of which is incorporated by reference herein in its entirety.

STATEMENT REGARDING FEDERALLY SPONSORED RESEARCH OR DEVELOPMENT n/a

THE NAMES OF THE PARTIES TO A JOINT RESEARCH AGREEMENT n/a

INCORPORATION BY REFERENCE OF MATERIAL SUBMITTED ON A COMPACT DISC n/a

BACKGROUND OF THE INVENTION

1. Field of the Invention

The present invention relates to a double progressive spectacle lens.

2. Description of Related Art

A distinction is made between two different types of lens in the case of progressive spectacle lenses of the prior art.

Lenses of type A are described, for example, in European patent EP 0 969 309 B1 from Rodenstock, these lenses having a front surface with a continuously varying surface power (progressive surface), and the eye-side surface being spherically or aspherically fashioned, or torically or atorically fashioned given an astigmatic prescription. Reference is made further to DE 301 69 35 from Carl Zeiss and DE 43 42 234 from Essilor.

Lenses of type B comprise a simple sphere or asphere and a more complex progressive atoric surface, the possibly prescribed cylinder being integrated in the progressive surface. Reference is made here to DE 43 37 369 from Rodenstock and to EP 0 809 126 from Seiko Epson.

Spectacle lenses of type C comprise a sphere or asphere or, in the case of an astigmatic prescription, a torus and a more complex progressive surface, in which case the latter compensates the deficits of the sphere or asphere or of the torus given a prescribed cylinder in the progressive surface. Reference is made here to DE 197 01 312 from Carl Zeiss.

Lenses of type D comprise two progressive surfaces. DE 33 31 757, DE 33 31 763 from Rodenstock and WO 00/55678, WO 01/73499 and WO 01/18591 of Johnson & Johnson describe such spectacle lenses.

All the above described types of lenses have a so-called "hourglass design". This describes the so-called progression zone, the characteristic vertical restriction in the middle of the lens that widens markedly upward and downward toward the distance zone and near zone.

With spectacle lens of type A and type C, it is absolutely necessary because of the symmetry of the second surface for the surface astigmatism of the progressive surface to have this hourglass shape. Lenses of type B also exhibit the described hourglass shape in the case of spherical prescriptions.

It has now been realized that there is no need to stay with these classic hourglass surfaces. However, it has even been realized that deviating from the hourglass surface shapes is even accompanied by optical and geometric advantages.

BRIEF DESCRIPTION OF THE INVENTION

It is an object of the invention to specify a double progressive spectacle lens in the case of which a progressive surface can be freely fashioned, and the second surface is then optimized in relation to the first prescribed surface.

The object is achieved by means of the characterizing part of claim 1.

At least one of the two progressive surfaces has at least one of the following properties:

principal line of sight a) the profile of the surface power along the principal line of sight in the progression channel is not monotonic between y=−15 mm and y=±10 mm, b) the profile of the surface astigmatism along the principal line of sight has at least two clearly expressed maxima that are at least 0.175 dpt above an adjacent minimum, c) the surface astigmatism A deviates in absolute terms by more than dA upward or downward from the prescription value $A_R$ of the cylinder at approximately all points along the principal line of sight, d) the surface astigmatism has a global maximum on or in the vicinity of the principal line of sight between y=±20 mm, e) the surface astigmatism has a local maximum on or in the vicinity of the principal line of sight between y=±20 mm, f) 85% of the change in the surface power along the principal line of sight is reached on each of the surfaces on a path of less than 11 mm, g) the channel width at 0.75 dpt has at least two minima in the progression channel between y=±10 mm and y=−18 mm, distance zone h) the surface astigmatism A deviates in the distance zone by more than dA upward or downward from the prescription value $A_R$ of the cylinder at approximately all points:
$|A-A_R| \geq dA$, with $dA \geq 0.18$ dpt i) the surface astigmatism A deviates in the distance zone by more than dA upward or downward from the prescription value $A_R$ of the cylinder at least one point:
$|A-A_R| \geq dA$, with $dA \geq 0.5$ dpt near zone j) the surface astigmatism A deviates in the near zone by more than dA upward or downward from the prescription value $A_R$ of the cylinder at approximately all points:
$|A-A_R| \geq dA$, with $dA \geq 0.22$ dpt k) the surface astigmatism A deviates in the near zone by more than dA upward or downward from the prescription value $A_R$ of the cylinder at least one point:
$|A-A_R| \geq dA$, with $dA \geq 0.4$ dpt.

A progressive surface is defined completely with the aid of a prescribed principal line and a prescribed distribution of the surface astigmatism. This also determines the surface power, as well as the properties in the position of use for spectacle lenses of type A, B and C. Proceeding in the opposite direction and prescribing the surface power in addition to the principal line results in a similar way in the surface astigmatism.

Since both astigmatism and dioptric power error are measured in the position of use and two imaging errors cannot simultaneously assume every arbitrary distribution, it is always necessary to compromise between the two variables. Although it is not possible when two progressive surfaces are available to achieve every arbitrary distribution of the imaging errors, given adequate deviation from the hourglass shape it is, however, possible to achieve better results than with only one progressive surface, doing so simultaneously, specifically, with reference to astigmatism and dioptric power profile.

Each of the properties formulated in claim 1 can improve the quality of the spectacle lens. Thus, a non-monotonically varying rise in dioptric power can reduce the overall height of the progressive lens.

A global maximum on or in the vicinity of the principal line leads to surfaces in which the Minkwitz rule no longer plays a role. This enables a design of progressive spectacle lenses with a wider production channel.

The channel width at x dpt is the distance between the lines of equal surface astigmatism with x dpt right and left of the principal line. The channel width is a function of the vertical coordinate y. In the case of an hourglass design, the channel width firstly decreases and then increases again from top to bottom. The channel width traverses a minimum. It has been realized according to the invention that it is more advantageous to fashion the functional profile of the channel width such that it assumes a number of minima with maxima lying therebetween.

Advantageous designs are to be gathered from the subclaims: thus, it is preferred that at least one of the two progressive surfaces has at least one of the following properties:

periphery l) the surface astigmatism has at least three local maxima within a circle about the origin of radius 30 mm, m) the maximum of the gradient of the surface power is greater than k*Add with k=0.2 1/mm, n) the maximum of the gradient of the surface astigmatism is greater than m*Add with m=0.2 1/mm.

Furthermore, at least one of the two progressive surfaces should have at least one of the following properties:

horizontal sections o) the surface power in the horizontal section has a local maximum in the distance zone or in the vicinity of the principal line of sight, p) the surface power in the horizontal section has a local minimum in the near zone or in the vicinity of the principal line of sight, q) the surface astigmatism in the horizontal section has a maximum in the progression zone or in the vicinity of the principal line of sight.

It is further preferred that in b) the maxima occur between y=−20 mm and y=+18 mm; that in c) $|A-A_R|\geq dA$, with $dA\geq 0.2$ dpt; that the maximum is between y=±10 in d); that in e) the maximum is between y=±10 and no higher value of the surface astigmatism exists at a distance of 20 mm; that in f) the increase in the surface power on the front surface and rear surface runs offset vertically in such a way that an extended progression length of more than 11 mm is produced in the position of use and that in g) the minimum channel width B at 0.75 is a function of the addition and smaller than B, with $B=b_0+b_1*Add$, $b_0$ and $b_1$ being capable of varying between the bounds $b_0$=8.5-9.5 mm and $b_1$=−2.2--1.8 mm/dpt, and the value of the other minima in each case being at least 12% above the value of the smallest minimum, and the middle of the channel, the arithmetic mean of the horizontal coordinates of the right-hand and left-hand lines of equal surface astigmatism being in a range of 4 mm, preferably 2 mm to right and left of the principal line of sight.

It is further preferred that in l) the surface astigmatism has at least three local maxima within a circle about the origin of radius 20 mm; that in m) the maximum is within a circular area about the original coordinates of radius 25 mm, preferably 22 mm and that in n) the maximum is within a circular area about the original coordinates of radius 20 mm, preferably 18 mm.

The invention is described by way of example below, without limiting the general idea of the invention, with the aid of exemplary embodiments and with reference to the drawings, to which reference is expressly made, furthermore, with regard to the disclosure of all inventive details not explained in more detail in the text, and in which

Figure 1:
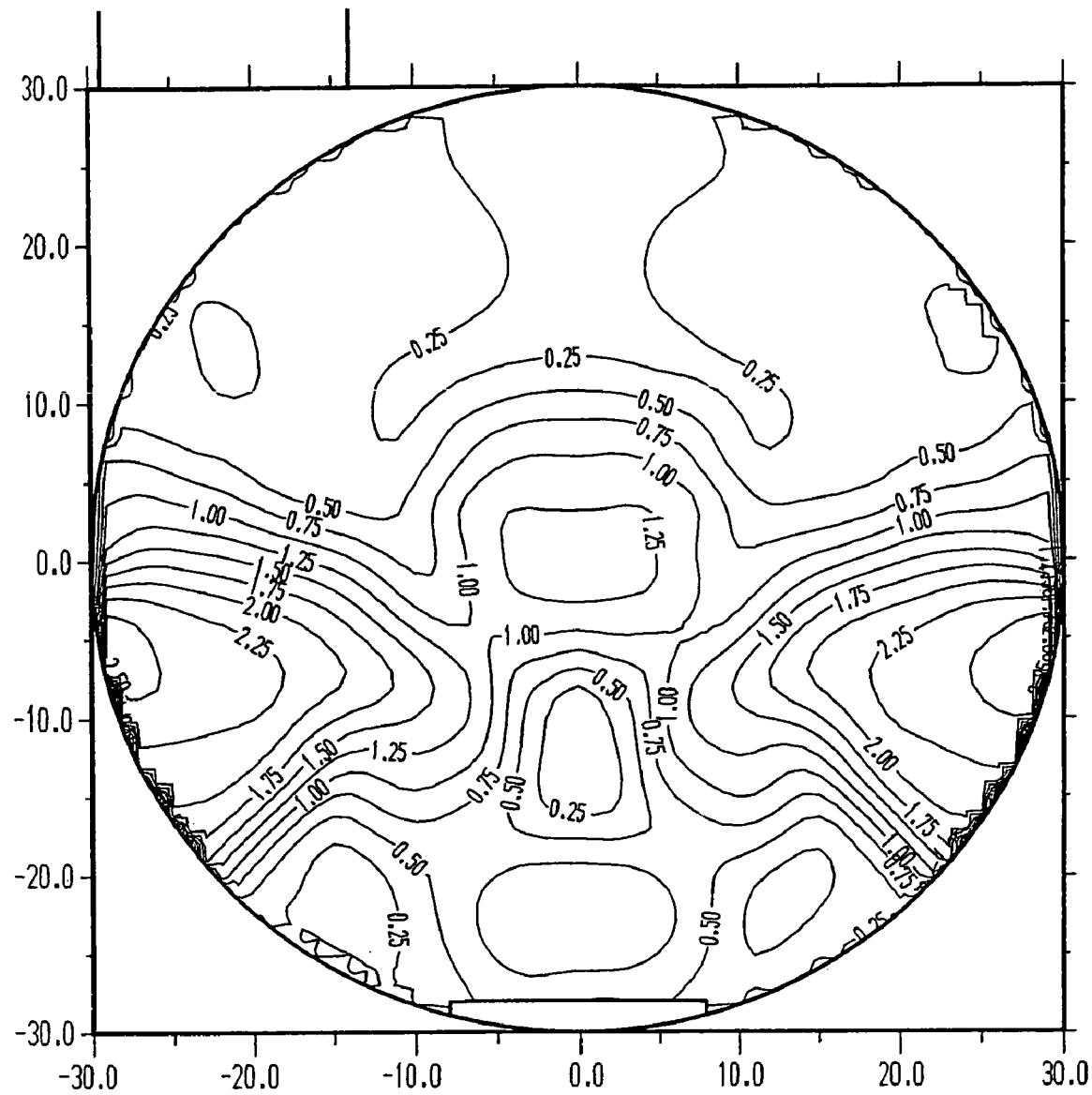
FIG. 1 shows the astigmatism of the front surface.
Figure 2:
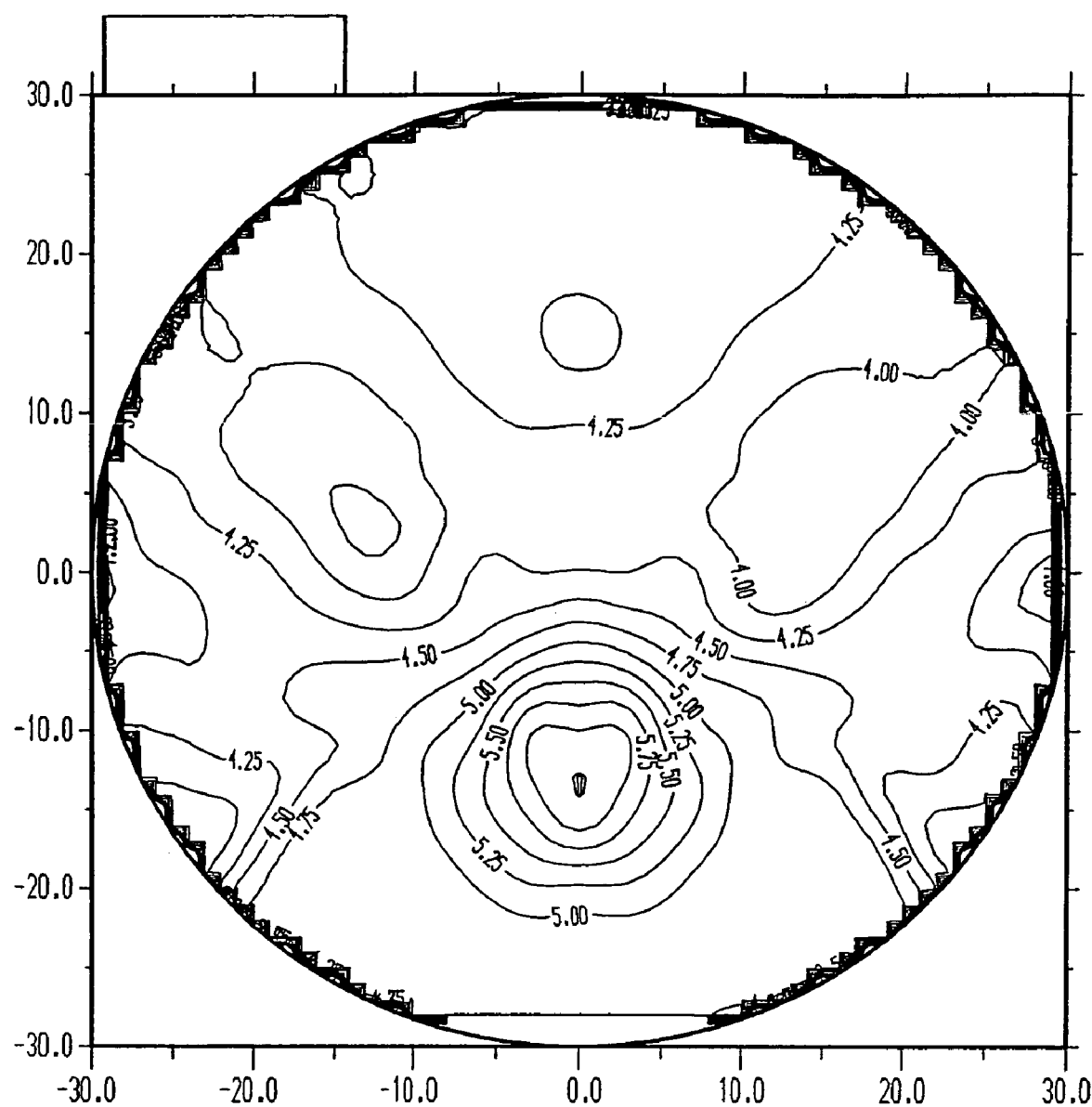
FIG. 2 shows the dioptric power of the front surface.
Figure 3:
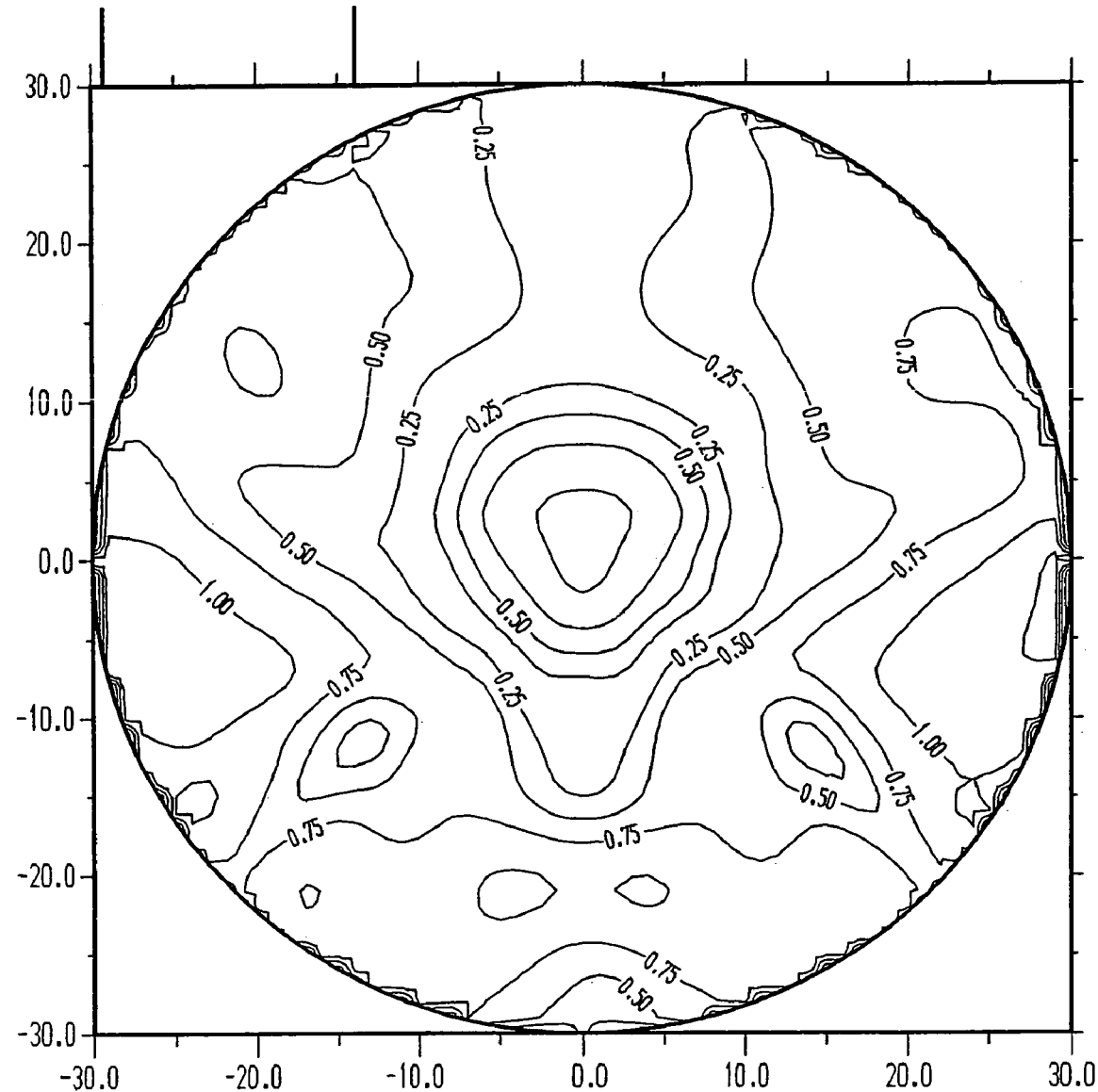
FIG. 3 shows the astigmatism of the rear surface.
Figure 4:
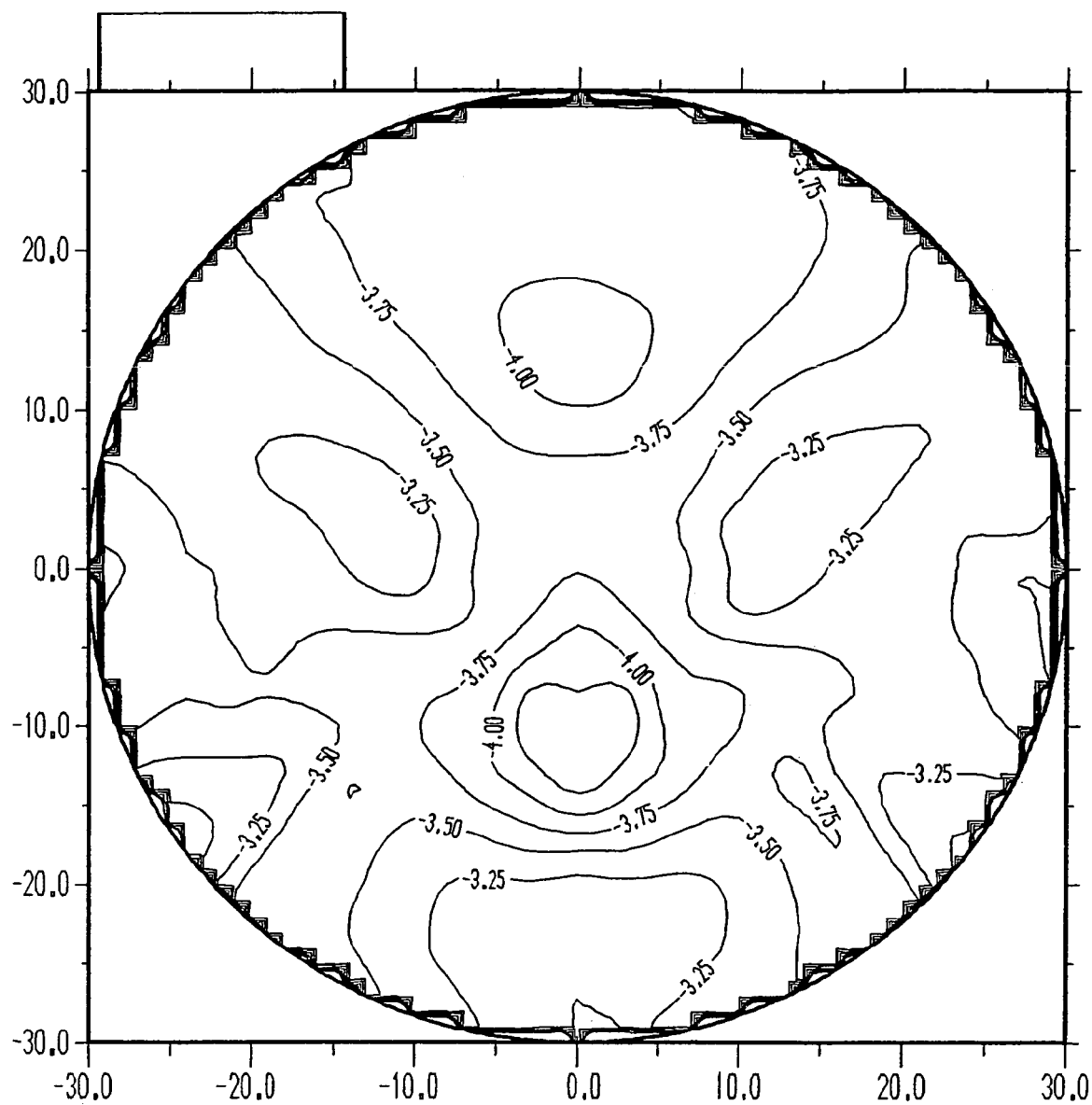
FIG. 4 shows the dioptric power of the rear surface.

Tables 1 and 2 show the sagitta of the front surface and of the rear surface.

The invention claimed is:

1. A double progressive spectacle lens, wherein at least one of the two progressive surfaces has at least one of the following properties, in relation to a principal line of sight, distance zone and near zone:

a) a profile of surface power along the principal line of sight in a progression channel is not monotonic between y=−15 mm and y=+10 mm, b) a profile of a surface astigmatism along the principal line of sight has at least two clearly expressed maxima that are at least 0.175 dpt above an adjacent minimum, c) a surface astigmatism A deviates in absolute terms by more than dA upward or downward from a prescription value $A_R$ of the cylinder at approximately all points along the principal line of sight, d) the surface astigmatism has a global maximum on or in the vicinity of the principal line of sight between y=±20 mm, e) the surface astigmatism has a local maximum on or in the vicinity of the principal line of sight between y=±20 mm, f) 85% of the change in the surface power along the principal line of sight is reached on each of the surfaces on a path of less than 11 mm, g) a channel width at 0.75 dpt has at least two minima in the progression channel between y=+10 mm and y=−18 mm, h) the surface astigmatism A deviates in the distance zone by more than dA upward or downward from the prescription value $A_R$ of the cylinder at approximately all points:
$|A-A_R|\geq dA$, with $dA\geq 0.18$ dpt i) the surface astigmatism A deviates in the distance zone by more than dA upward or downward from the prescription value $A_R$ of the cylinder at least one point:
$|A-A_R|\geq dA$, with $dA\geq 0.5$ dpt j) the surface astigmatism A deviates in the near zone by more than dA upward or downward from the prescription value $A_R$ of the cylinder at approximately all points:
$|A-A_R|\geq dA$, with $dA\geq 0.22$ dpt k) the surface astigmatism A deviates in the near zone by more than dA upward or downward from the prescription value $A_R$ of the cylinder at at least one point: $|A-A_R| \geq dA$, with $dA \geq 0.4$ dpt.

2. The double progressive spectacle lens as claimed in claim 1, wherein at least one of the two progressive surfaces has at least one of the following properties, in relation to periphery:

l) the surface astigmatism has at least three local maxima within a circle about the origin of radius 30 mm, m) the maximum surface power gradient is greater than k*Add with k=0.2 l/mm, n) the maximum surface astigmatism gradient is greater than m*Add with m=0.2 l/mm.

3. The double progressive spectacle lens as claimed in claim 1, wherein at least one of the two progressive surfaces has at least one of the following properties, in relation to horizontal sections:

o) the surface power in the horizontal section has a local maximum in the distance zone or in the vicinity of the principal line of sight, p) the surface power in the horizontal section has a local minimum in the near zone or in the vicinity of the principal line of sight, q) the surface astigmatism in the horizontal section has a maximum in the progression zone or in the vicinity of the principal line of sight.

4. The double progressive spectacle lens as claimed in claim 1, wherein in b) the maxima occur between y=−20 mm and y=+18 mm.

5. The double progressive spectacle lens as claimed in claim 1, wherein in c) $|A-A_R| \geq dA$, with $dA \geq 0.2$ dpt.

6. The double progressive spectacle lens as claimed in claim 1, wherein the maximum is between y=±10 in d).

7. The double progressive spectacle lens as claimed in claim 1, wherein in e) the maximum is between y=±10 and no higher value of the surface astigmatism exists at a distance of 20 mm.

8. The double progressive spectacle lens as claimed in claim 1, wherein in f) an increase in the surface power on the front surface and rear surface runs offset vertically so that an extended progression length of more than 11 mm is produced in a position of use.

9. The double progressive spectacle lens as claimed in claim 1, wherein in g) minimum channel width B at 0.75 is a function of the addition and smaller than B, with $B=b_0+b_1*Add$, $b_0$ and $b_1$ being capable of varying between $b_0=8.5-9.5$ mm and $b_1=-2.2-1.8$ mm/dpt, and the value of the other minima in each case being at least 12% above the value of the smallest minimum, and the middle of the channel, the arithmetic mean of the horizontal coordinates of the right-hand and left-hand lines of equal surface astigmatism being in a range of 4 mm, preferably 2 mm right and left of the principal line of sight.

10. The double progressive spectacle lens as claimed in claim 2, wherein in l) the surface astigmatism has at least three local maxima within a circle about the origin of radius 20 mm.

11. The double progressive spectacle lens as claimed in claim 2, wherein in m) the maximum is within a circular area about the original coordinates of radius 25 mm, preferably 22 mm.

12. The double progressive spectacle lens as claimed in claim 2, wherein in n) the maximum is within a circular area about the original coordinates of radius 20 mm, preferably 18 mm.

* * * * *